(12) United States Patent
Tsai et al.

(10) Patent No.: US 10,795,247 B2
(45) Date of Patent: Oct. 6, 2020

(54) LIGHT SOURCE MODULE AND PROJECTOR USING THE SAME

(71) Applicant: BenQ Corporation, Taipei (TW)

(72) Inventors: Hung-Chi Tsai, New Taipei (TW); Chen-Cheng Huang, Taoyuan (TW); Chiu-Ping Chen, New Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 16/027,877

(22) Filed: Jul. 5, 2018

(65) Prior Publication Data

US 2019/0011822 A1  Jan. 10, 2019

(30) Foreign Application Priority Data

Jul. 4, 2017 (TW) .............................. 106122437 A

(51) Int. Cl.
| | |
|---|---|
| *G03B 21/20* | (2006.01) |
| *G02B 26/00* | (2006.01) |
| *G03B 21/00* | (2006.01) |
| *G02B 7/00* | (2006.01) |
| *G03B 33/08* | (2006.01) |

(52) U.S. Cl.
CPC .............. *G03B 21/20* (2013.01); *G02B 7/006* (2013.01); *G02B 26/008* (2013.01); *G03B 21/2013* (2013.01); *G03B 33/08* (2013.01); *G03B 21/008* (2013.01); *G03B 21/2033* (2013.01); *G03B 21/2066* (2013.01)

(58) Field of Classification Search
CPC ......................... G03B 21/204; G03B 21/2093; G03B 21/008; G03B 21/2013; G03B 21/2066; G03B 21/2033; G02B 26/008; G02B 7/006
See application file for complete search history.

(56) References Cited

U.S. PATENT DOCUMENTS

| | | | | |
|---|---|---|---|---|
| 2006/0007407 | A1* | 1/2006 | Matsui ................. | G02B 26/008 353/84 |
| 2012/0050691 | A1* | 3/2012 | Tsuda .................. | G03B 21/204 353/31 |
| 2012/0201030 | A1* | 8/2012 | Yuan .................... | G02B 26/008 362/293 |
| 2016/0041457 | A1* | 2/2016 | Oh ........................ | G03B 21/204 353/31 |
| 2018/0080630 | A1* | 3/2018 | Wang ...................... | F21V 9/30 |
| 2018/0164667 | A1* | 6/2018 | Wang .................... | G02B 26/00 |

FOREIGN PATENT DOCUMENTS

| | | |
|---|---|---|
| CN | 102645822 A | 8/2012 |
| EP | 2787390 A1 | 10/2014 |

OTHER PUBLICATIONS

Office Action of CN Application No. 201710505351.1, dated Jan. 17, 2020, 6 pages.

* cited by examiner

*Primary Examiner* — Michelle M Iacoletti
*Assistant Examiner* — Danell L Owens

(57) ABSTRACT

A light source module includes a filter wheel, a composite light source, and a third light source. The filter is rotatable with respect to a pivot and includes a first color filter area, a second color filter area, and a light transmitting area. The composite light source emits a composite light consisting of a first and second color lights.

20 Claims, 5 Drawing Sheets

LIGHT SOURCE MODULE AND PROJECTOR USING THE SAME

BACKGROUND OF THE INVENTION

1. Field of the Invention

This invention generally relates to a light source module and a projector using the same.

2. Description of the Prior Art

In present, displays for displaying images can be roughly sorted to the projecting type display, such as projector, and the direct-view type display, such as CRT display, plasma display, liquid crystal display, etc. Considering the limitation of manufacturing technique and the cost of large size panel, it usually adopts the projecting type display for displaying large size images.

A projector can use halogen lamps or LEDs as the light source. The halogen lamp generally has a shorter lifetime of about 1000 hours and transforms merely 2-3% of energy into light, wherein the rest of energy is transformed into heat. Contrast to the halogen lamp, LED is widely used as the light source of a projector due to its higher energy utilization rate. Conventional projector LED light sources generally include a red LED light source, a green LED light source, and a blue LED light source. Each light source includes a plurality of LEDs to form a light source array to increase the brightness of the images projected by the projector. As a result, three light source arrays are formed and therefore it is hard to decrease the volume of the projector. The conventional light source and the projector using the same are still improvable.

SUMMARY OF THE INVENTION

It is an object of the present invention to provide a light source module and a projector using the same, wherein the number of light sources of different color can be reduced.

The light source module of the present invention includes a filter wheel, a composite light source, and a third light source. The filter wheel is rotatable with respect to a pivot and includes a first color filter area, a second color filter area, and a light transmitting area. The composite light source is disposed on one side of the filter wheel and emits a composite light consisting of a first color light and a second color light. When the filter wheel rotates to make the first color filter area correspond to a filtered light path, the composite light source emits the composite light to the first color filter area for filtering to obtain a first color light. When the filter wheel rotates to make the second color filter area correspond to the filtered light path, the composite light source emits the composite light to the second color filter area for filtering to obtain a second color light. When the filter wheel rotates to make the light transmitting area correspond to the filtered light path, the composite light source switches on selectively and emits the composite light transmitting through the light transmitting area. When the filter wheel rotates to make the light transmitting area correspond to the filtered light path, the third light source switches on selectively and emits the third light joining with the filtered light path, wherein the time intervals that the composite light source switches on and the third light source switches on are continuous or at least partially overlapping.

By the time of the light transmitting area corresponding to the filtered light path, the time intervals that the composite light source switches on and the third light source switches on are not overlapping.

The time intervals that the composite light source switches on and the third light source switches on are continuous.

By the time of the light transmitting area corresponding to the filtered light path, the time intervals that the composite light source switches on and the third light source switches on are at least partially overlapping.

The light source module further includes a dichroic mirror disposed between the composite light source and the filter wheel, wherein the dichroic mirror allows the composite light to transmit therethrough and toward the filter wheel, wherein the third color light is reflected and guided to the filter wheel by the dichroic mirror.

The light source module further comprises a dichroic mirror disposed on different side of the filter wheel with respect to the composite light source, wherein the first color light and the second color light transmit through dichroic mirror, wherein the third color light is reflected by the dichroic mirror to join with the filtered light path.

The colors of the third color light and the composite light are complementary colors.

The light source module further includes a light source driving device, a filter wheel driving device, and a first control module. The light source driving device is coupled respectively to the composite light source and the third light source, wherein the light source driving device drives the composite light source and the third light source to emit the composite light and the third color light respectively. The filter wheel driving device is coupled to the filter wheel, wherein the filter wheel driving device drives the filter wheel to rotate. The first control module is coupled to the light source driving device and the filter wheel driving device respectively, wherein the first control module controls the light source driving device and the filter wheel driving device.

The light source module further includes a first light guide module disposed between the dichroic mirror and the filter wheel, wherein the first light guide module guides the light transmitting through the dichroic mirror to the filter wheel.

The first color light is a red ray. The second color light is a green ray. The third color light is blue ray. The first color filter area allows the red ray to transmit therethrough. The second color filter area allows the green ray to transmit therethrough.

The light transmitting area is a hallow opening.

The filter wheel includes a plurality of corresponding first color filter areas.

The filter wheel includes a plurality of corresponding second color filter areas.

The filter wheel includes a plurality of corresponding light transmitting areas.

The projector of the present invention includes the light source module, a Digital Micromirror Device (DMD), a second control module, and an imaging device. The DMD is disposed on the other side of the filter wheel with respect to the composite light source, wherein the DMD receives the light transmitting through the filter wheel. The second control module is coupled to the DMD for controlling the DMD. The imaging device is disposed on the other side of the filter wheel with respect to the composite light source, wherein the imaging device uses the light transmitting through the filter wheel for imaging.

The projector further includes a second light guide module disposed between the filter wheel and DMD, wherein the second light guide module guides the light transmitting through the filter wheel to the imaging device.

DETAILED DESCRIPTION OF THE PREFERRED EMBODIMENT

Figure 1A:
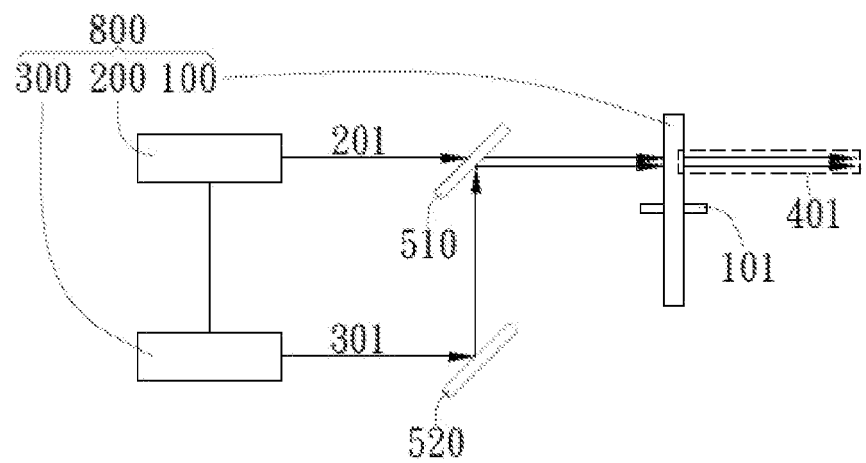
FIGS. 1A and 1B are schematic views of one embodiment of the present invention.
Figure 1B:
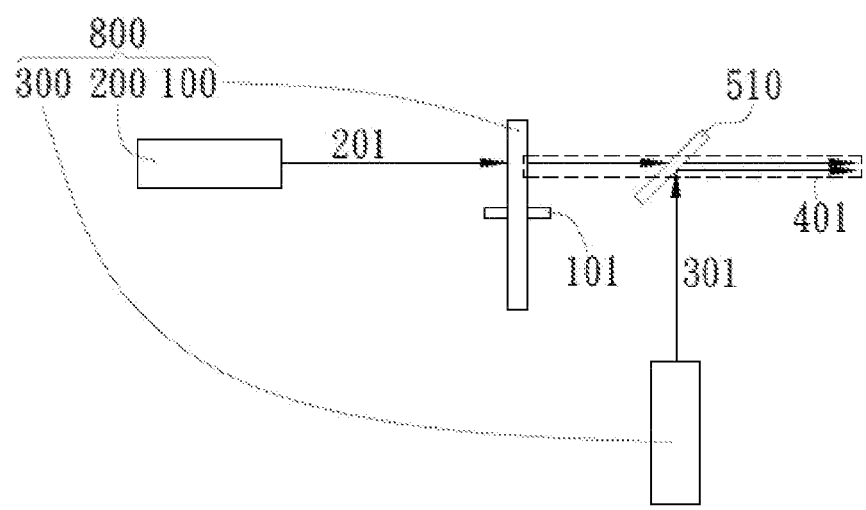

As shown in the embodiment in FIGS. 1A and 1B, the light source module 800 of the present invention includes a filter wheel 100, a composite light source 200, and a third light source 300. The filter wheel 100 is rotatable with respect to a pivot 101. As shown in the embodiment in FIG. 2, the filter wheel includes at least a first color filter area, at least a second color filter area, and at least a light transmitting area. The composite light source 200 is disposed on one side of the filter wheel 100 and emits a composite light 201 consisting of a first color light and a second color light. A light path of the composite light 201 which has transmitted through the filter wheel 100 is a filtered light path. When the filter wheel 100 rotates to make the first color filter area 110 correspond to the filtered light path 401, the composite light source 200 emits the composite light 201 to the first color filter area 110 for filtering to obtain a first color light. When the filter wheel 100 rotates to make the second color filter area 120 correspond to the filtered light path 401, the composite light source 200 emits the composite light 201 to the second color filter area 120 for filtering to obtain a second color light.

As shown in the embodiment in FIGS. 1A and 1B, when the filter wheel rotates to make the light transmitting area correspond to the filtered light path 401, the third light source switches on selectively and emits the third light 301 joining with the filtered light path 401, wherein the time intervals that the composite light source 200 switches on and the third light source 300 switches on are continuous or at least partially overlapping. More particularly, depending on the requirement of manufacturing or use, the third light source can be disposed on the same side of filter wheel with respect to the composite light 200 as shown in FIG. 1A or be disposed on the different side of filter wheel with respect to the composite light 200 as shown in FIG. 1B.

In a preferable embodiment, the colors of the third color light and the composite light are complementary colors. The term complementary colors refers to pairs of colors which produce a specific color when combined. As to the RGB color model, two colors are complementary colors if a white color is produced when these two colors are mixed together with the same quantity. As shown in the embodiment in FIG. 1A, since the filter wheel is rotatable, when the composite light source 200 emits the composite light 201 respectively to the first color filter area 110 and the second color filter area 120 in a first time interval and in a second time interval, the first color filter area 110 and the second color filter area 120 will filter out a first color light and a second color light respectively. The third light source 300 emits the third color light 301 transmitting through the light transmitting area 130.

In a preferable embodiment, the first color light, the second color light, and the third color light are respectively one of the "three primary colors" for additive color mixing. The first color filter area 110 allows the first color light to transmit therethrough. The second color filter area 120 allows the second color light to transmit therethrough. The light transmitting area 130 can be a hallow opening or a transparent plate allowing lights to transmit therethrough. For example, light transmitting area 130 can be, but not limited to, a plate made by transparent material. For example, in one embodiment, the first color light is a red ray, the second color light is a green ray, wherein the composite light formed by the additive mixing of the two is a yellow ray, wherein the third color light complementary to it is a blue ray. Thus, with reference to the embodiment shown in FIG. 3, when the filter wheel 100 shown in FIG. 1A rotates to make the first color filter area 110 and correspond to the filtered light path 401 in the first time interval T1, the composite light source 200 emits the composite light 201 to the first color filter area 110 in the first time interval T1. The first color filter area 110 allows the red ray to transmit therethrough, i.e. a red ray is obtained through filtering. When the filter wheel 100 rotates to the second color filter area 120 and corresponds to the filtered light path 401 in the second time interval T2, the composite light source 200 emits the composite light 201 to the second color filter area 120 in the second time interval T2. The second color filter area 120 allows the green ray to transmit therethrough, i.e. a green ray is obtained through filtering. When the filter wheel 100 rotates to the light transmitting area 130 and corresponds to the filtered light path 401 in the third time interval T3, the third light source 300 emits the third color light 301 to the light transmitting area 130 in the third time interval T3. The light transmitting area 130 allows the third color light to transmit therethrough, i.e. a blue ray is obtained through filtering. As shown in the embodiment in FIG. 1, the light source module 800 further includes a dichroic mirror 510 and a reflecting mirror 520. The dichroic mirror 510 is disposed between the composite light source 200 and the filter wheel 100, wherein the dichroic mirror 510 allows the composite light 201 to transmit therethrough and toward the filter wheel 100 on the basis of wavelength difference, wherein the third color light 301 is reflected and guided to the filter wheel 100 by the dichroic mirror 510. The reflecting mirror is disposed on the transmitting path of the third color light 301 and guides the third color light to the dichroic mirror 510. In different embodiments, however, the third light source 300 emits directly the third color light 301 to the dichroic mirror 510, wherein it is not necessary to dispose the reflecting mirror.

Figure 3:
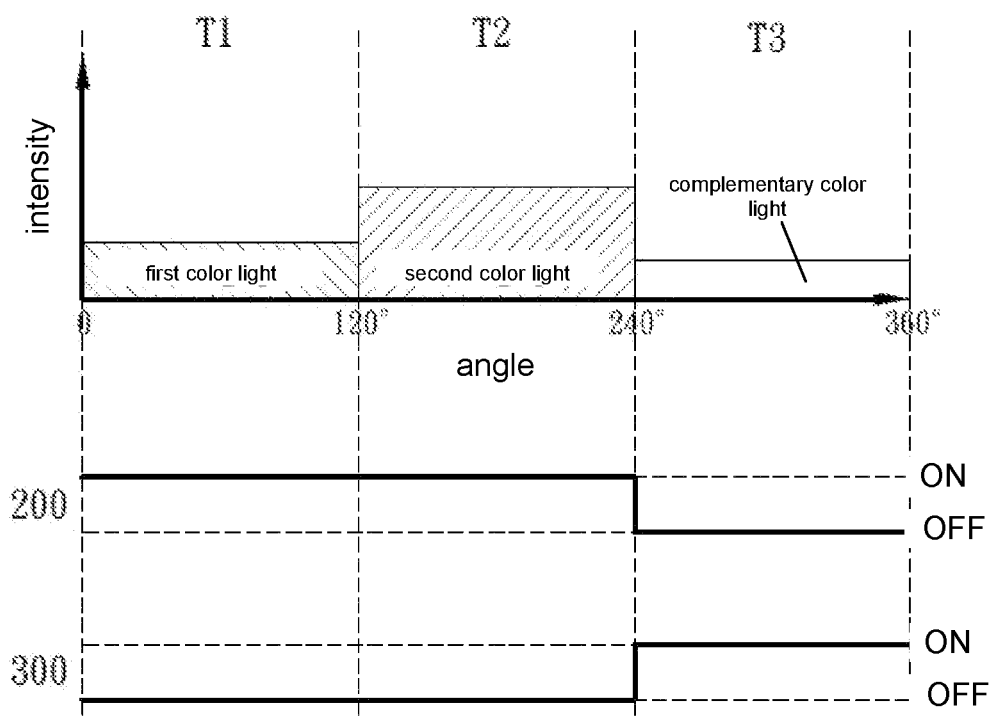
FIGS. 3 to 5 are schematic views that show the relation between the transmitting lights and the switching on/off of the light sources of the light source module.

On the other hand, with reference to the embodiment shown in FIG. 3, when the filter wheel 100 rotates to the light transmitting area 130 and corresponds to the filtered light path 401 in the third time interval T3, the third light source 300 emits the third color light 301, i.e. a blue ray, in the third time interval T3, which is reflected by the dichroic mirror 510 to join with the filtered light path 401. More particularly, in this embodiment, the dichroic mirror 510 is disposed on different side of the filter wheel 100 with respect to the composite light source 200. The first color light and the second color light transmit through dichroic mirror 510, wherein the third color light 301 is reflected by the dichroic mirror 510 to join with the filtered light path 401. Accordingly, the present invention is able to produce the "three primary colors" by using merely two light sources, i.e. the composite light source and the third color light source.

Figure 2:
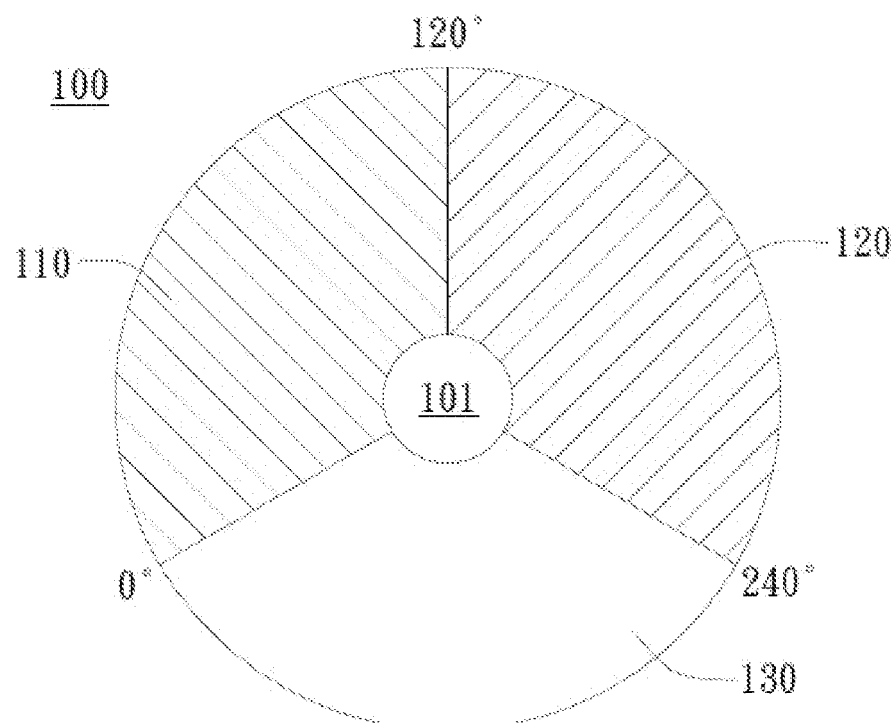
FIG. 2 is a schematic view of one embodiment of the filter wheel of the present invention.

As shown in the embodiment in FIGS. 2 and 3, the first color filter area 100, the second color filter area 200, and the light transmitting area 130 of the filter wheel 100 are fan-shaped trisections having equal angles and correspond to the first time interval T1, the second time interval T2, and the third time interval T3 respectively. The intensity of each color light and the angles of the color filter areas and light transmitting area can be modified depending on the requirement. For example, the intensity of the first color light, such as a red ray, can be increased to increase the intensity of the red ray when displaying images by a projecting device, which makes the images redder. Furthermore, the angle of the light transmitting area 130 can be increased to increase the time for emitting the third color light by the third light source 300.

Figure 4:
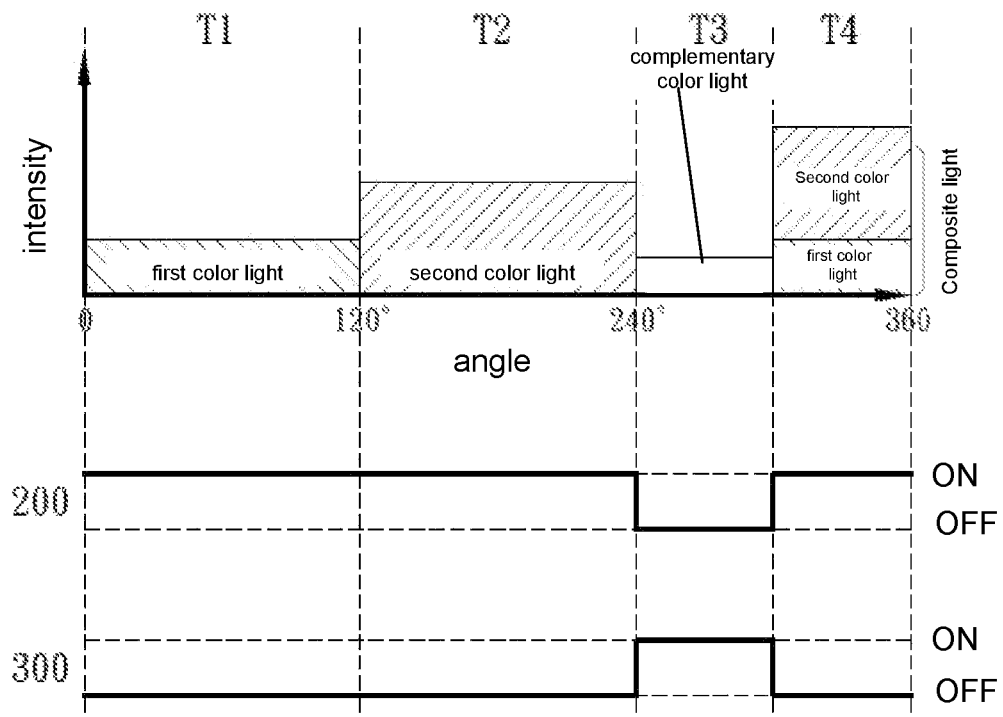

In different embodiments, the first color filter area 100, the second color filter area 200, and the light transmitting area 130 of the filter wheel 100 can be fan-shaped trisections having unequal angles and are not necessarily corresponding to these three time intervals. As shown in the embodiment in FIG. 4, the first time interval T1 corresponds to the first color filter area 110, the second time interval T2 corresponds to the second color filter area 120, wherein the un-overlapping third time interval T3 and fourth time interval T4 together correspond to the light transmitting area 130, wherein the first color filter area 100, the second color filter area 200, and the light transmitting area 130 are still fan-shaped trisections having equal angles. The composite light source 200 emits the composite light 201 to the first color filter area 110 in the first time interval T1 and emits the composite light 201 to the second color filter area 120 in the second time interval T2, wherein the third light source emits the third color light in the third time interval T3, wherein the composite light source further emits the composite light transmitting through the light transmitting area 130 in a fourth time interval T4 that the light transmitting area corresponds to a filtered light path 401. Specifically, in this embodiment, the time intervals that the composite light source 200 switches on and the third light source 300 switches on are continuous. More particularly, if the first color light is a red ray, the second color light is a green ray, the composite light formed by mixing the above two is a yellow ray, wherein the third color light complementary to it is a blue ray. Accordingly, with this modification, the intensity of a yellow ray can be increased to increase the color saturation of the images, such as faces, sunset, desert, etc. that requires higher yellow ray intensity.

Figure 5:
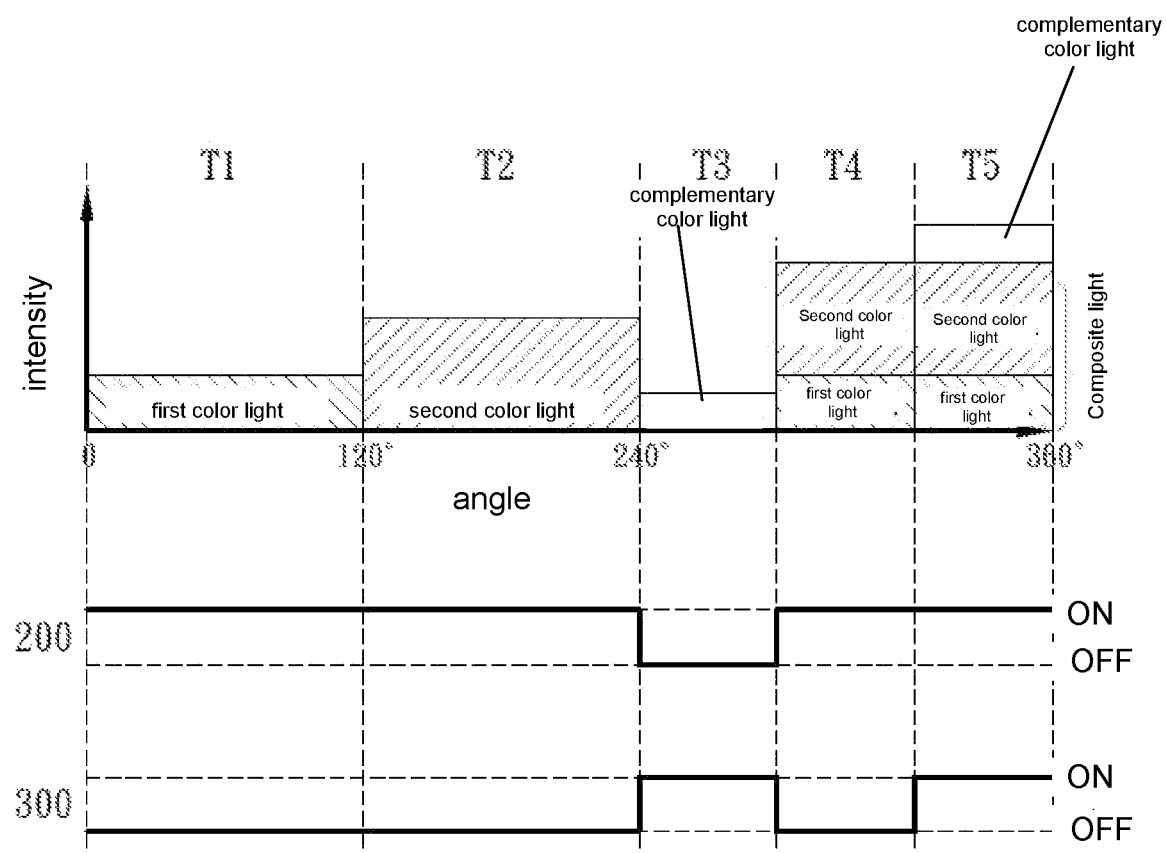

In different embodiments, the composite light source and the third light source further emit the composite light and the third color simultaneously in the fifth time interval. In other words, in the time the light transmitting area 130 corresponds to the filtered light path 401, the time intervals that the composite light source 200 switches on and the third light source 300 switches on are at least partially overlapping. More particularly, as shown in the embodiment in FIG. 5, if the first color light is a red ray, the second color light is a green ray, the composite light formed by additive mixing of the above two is a yellow ray, wherein the third color light complementary to it is a blue ray. A white ray can be formed by additive mixing of a yellow ray and a blue ray. Accordingly, with this modification, the overall brightness can be increased to increase the brightness of the images, such as burning sun, light beam, etc. that requires higher brightness.

In the embodiment shown in FIG. 2, the first color filter area 100, the second color filter area 200, and the light transmitting area 130 of the filter wheel 100 are fan-shaped trisections having equal angles. In different embodiments, the number of the first color filter area 100, the second color filter area 200, and the light transmitting area 130 can be increased depending on the requirement. More particularly, as shown in the embodiment in FIG. 6, the light source module 800 of the present invention includes a filter wheel 100, a composite light source 200, and a third light source 300. The filter wheel is rotatable with respect to a pivot 101. The composite light source 200 is disposed on one side of the filter wheel 100 and emits a composite light consisting of a first color light and a second color light. As shown in the embodiment in FIG. 7, the filter wheel 100 includes a plurality of first color filter areas, second color filter areas, and light transmitting areas having the same amount corresponding to each other. When the filter wheel 100 shown in FIG. 7 rotates to the first color filter area 110 and corresponds to a filtered light path 401 shown in FIG. 6, the composite light source emits the composite light to the first color filter area for filtering to obtain a first color light. When the filter wheel 100 rotates to the second color filter area 120 and corresponds to the filtered light path 401, the composite light source 200 emits the composite light 201 to the second color filter area 120. The third light source 300 is disposed on the same side of the filter wheel 100 with respect to the composite light source 200. The first color light, the second color light, and the third color light are respectively one of the three primary colors for additive color mixing. When the filter wheel 100 rotates to the light transmitting area 130 and corresponds to the filtered light path 401, the composite light source 200 switches on selectively and emits the composite light 201, transmitting through the light transmitting area 130. The third light source 300 switches on selectively and emits the third light 301, transmitting through the light transmitting area 130, wherein the time intervals that the composite light source 200 switches on and the third light source 300 switches on are continuous or at least partially overlapping.

Figure 6:
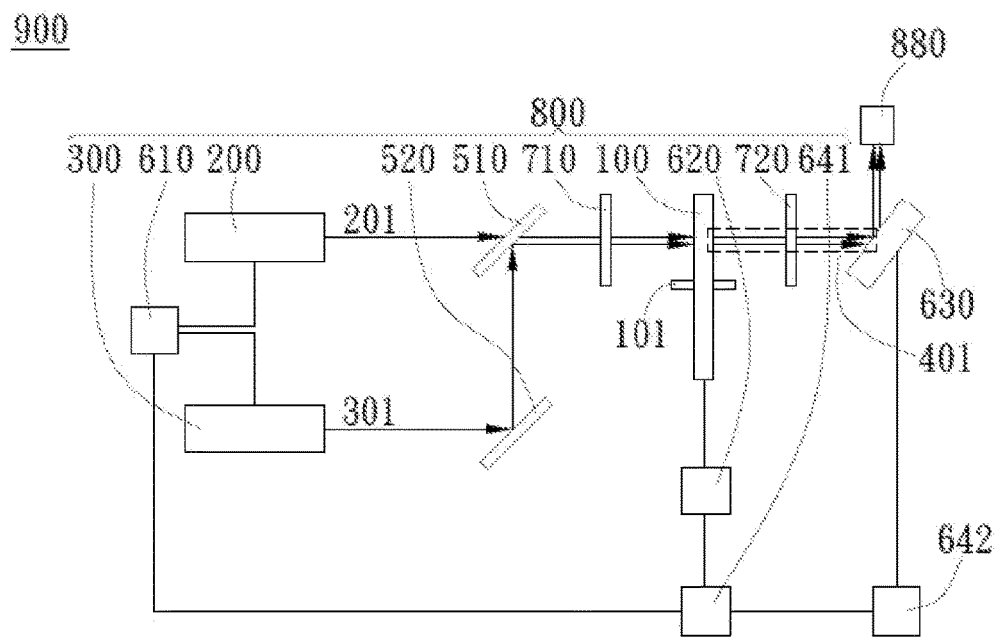
FIGS. 6 and 7 are schematic views of different embodiments of the present invention.
Figure 7:
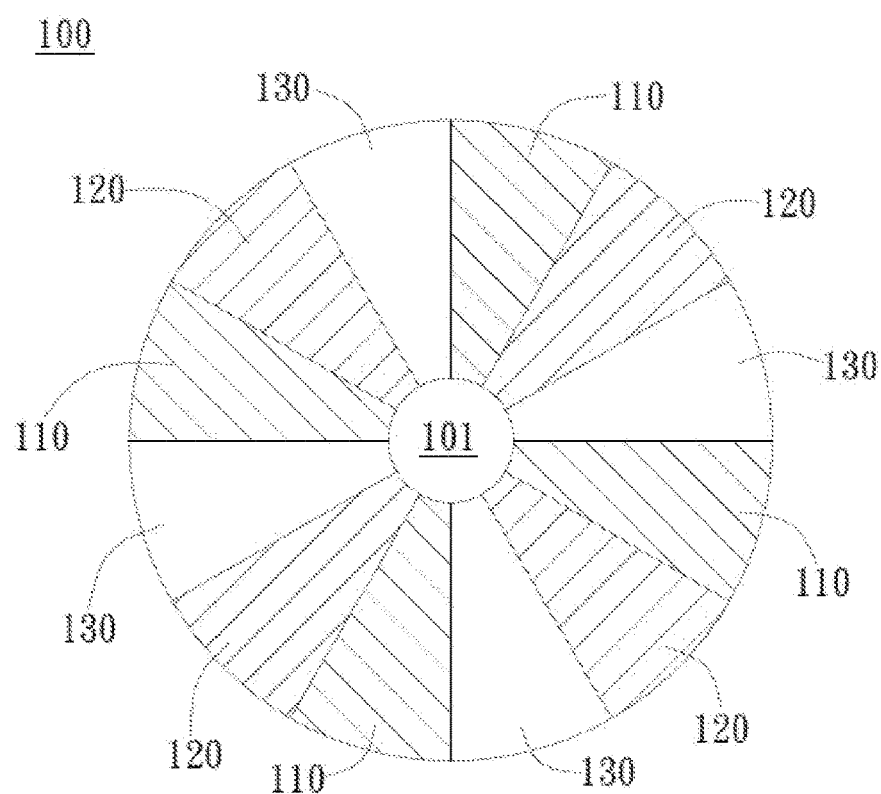

As shown in the embodiment in FIG. 6, the light source module 800 further includes a light source driving device 610, a filter wheel driving device 620, and a first control module 641. The light source driving device 610 is coupled respectively to the composite light source 200 and the third light source 300, wherein the light source driving device 610 drives the composite light source 200 and the third light source 300 to emit the composite light and the third color light respectively. The light source driving device 610 includes a device having a driving IC. The filter wheel driving device 620 is coupled to the filter wheel 100, wherein the filter wheel driving device 620 drives the filter wheel 100 to rotate. The filter wheel driving device 620 includes a motor. The first control module 641 is coupled to the light source driving device 610 and the filter wheel driving device 620 respectively, wherein the first control module 610 controls the light source driving device 620 and the filter wheel driving device 620. The first control module 641 includes a control IC.

As shown in the embodiment in FIG. 6, the light source module 800 further includes a first light guide module 710 disposed between the dichroic mirror 510 and the filter wheel 100, wherein the first light guide module 710 guides the light transmitting through the dichroic mirror 510 to the filter wheel 100. The light source module 800 further includes a second light guide module 720 disposed between the filter wheel 100 and a DMD, wherein the second light guide module 720 guides the light transmitting through the filter wheel 100 to the imaging device 630. The first and second light guide module includes reflecting mirrors and the combination thereof.

As a result, the light source module of the present invention is able to convert the composite light emitted by the composite light source into a first color light and a second color light, wherein these two lights and the third color light emitted by the third light source are respectively one of the three primary colors for additive color mixing. In other words, it uses merely two single color light sources for outputting three primary colors. Therefore, the number of light sources of different colors can be reduced. On the other hand, the light source module of the present invention can form a projector with an imaging device. As shown in the embodiment in FIG. 6, the projector of the present invention 900 includes the light source module, a Digital Micromirror Device (DMD), a second control module, and an imaging device. The DMD 630 is disposed on the other side of the filter wheel 100 with respect to the composite light source 200, wherein the DMD receives the light transmitting through the filter wheel 100. The second control module 642 is coupled to the DMD 630 for controlling the DMD. The first control module 641 and the second control module 642 can be different control modules on the same control chip. The imaging device 880 is disposed on the other side of the filter wheel 100 with respect to the composite light source 200, wherein the imaging device 880 uses the light transmitting through the filter wheel 100 for imaging. The imaging device 880 includes a lens or the combination thereof. Since the use of different color light sources can be reduced in the light source module of the present invention, the space for disposing the light source in the projector can be saved to reduce the volume of the projector.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light source module, comprising:
   a filter wheel, wherein the filter wheel is rotatable with respect to a pivot and includes a first color filter area, a second color filter area, and a light transmitting area;
   a composite light source disposed on one side of the filter wheel, wherein the composite light source emits a composite light consisting of a first color light and a second color light, wherein:
      when the filter wheel rotates to make the first color filter area corresponds to a filtered light path, the composite light source emits the composite light to the first color filter area for filtering to obtain a first color light;
      when the filter wheel rotates to make the second color filter area corresponds to the filtered light path, the composite light source emits the composite light to the second color filter area for filtering to obtain a second color light;
      when the filter wheel rotates to make the light transmitting area corresponds to the filtered light path, the composite light source switches on selectively and emits the composite light transmitting through the light transmitting area;
   a third light source, wherein when the filter wheel rotates to make the light transmitting area correspond to the filtered light path, the third light source switches on selectively and emits the third light joining with the filtered light path, wherein the time intervals that the composite light source switches on and the third light source switches on are continuous or at least partially overlapping, wherein the third light source switches off when the filter wheel rotates to make the first color filter area correspond to the filtered light path as well as the second color filter area correspond to the filtered light path,
   wherein the light emitted by the third light source and the light emitted by the composite light source are light of different colors.

2. The light source module of claim 1, wherein by the time of the light transmitting area corresponding to the filtered light path, the time intervals that the composite light source switches on and the third light source switches on are not overlapping, wherein the time interval that the third light source switches on is adjustable.

3. The light source module of claim 2, wherein the time intervals that the composite light source switches on and the third light source switches on are continuous.

4. The light source module of claim 1, wherein by the time of the light transmitting area corresponding to the filtered light path, the time intervals that the composite light source switches on and the third light source switches on are at least partially overlapping to form a white ray.

5. The light source module of claim 1, further comprising:
   a dichroic mirror disposed between the composite light source and the filter wheel, wherein the dichroic mirror allows the composite light to transmit therethrough and toward the filter wheel, wherein the third color light is reflected and guided to the filter wheel by the dichroic mirror.

6. The light source module of claim 1, further comprising a dichroic mirror disposed on different side of the filter wheel with respect to the composite light source, wherein the first color light and the second color light transmit through dichroic mirror, wherein the third color light is reflected by the dichroic mirror to join with the filtered light path.

7. The light source module of claim 1, wherein the colors of the third color light and the composite light are complementary colors.

8. The light source module of claim 1, further comprising:
   a light source driving device coupled respectively to the composite light source and the third light source, wherein the light source driving device drives the composite light source and the third light source to emit the composite light and the third color light respectively;
   a filter wheel driving device coupled to the filter wheel, wherein the filter wheel driving device drives the filter wheel to rotate;
   a first control module coupled to the light source driving device and the filter wheel driving device respectively, wherein the first control module controls the light source driving device and the filter wheel driving device.

9. The light source module of claim 1, further comprises a first light guide module disposed between the dichroic mirror and the filter wheel, wherein the first light guide module guides the light transmitting through the dichroic mirror to the filter wheel.

10. The light source module of claim 1, wherein the filter wheel includes a plurality of corresponding first color filter areas.

11. The light source module of claim 10, wherein the filter wheel includes a plurality of corresponding second color filter areas.

12. A projector, comprising:
the light source module of claim 1;
a Digital Micromirror Device (DMD) disposed on the other side of the filter wheel with respect to the composite light source, wherein the DMD receives the light transmitting through the filter wheel;
a second control module coupled to the DMD for controlling the DMD;
an imaging device disposed on the other side of the filter wheel with respect to the composite light source,
wherein the imaging device uses the light transmitting through the filter wheel to form an image.

13. The projector of claim 12, further comprises a second light guide module disposed between the filter wheel and DMD, wherein the second light guide module guides the light transmitting through the filter wheel to the imaging device.

14. The light source module of claim 12, wherein when the light transmitting area corresponds to the filtered light path, the third light source switches off after emitting the third light in a first time interval, the composite light source switches off in the first time interval, the third light source switches off in a second time interval, and the composite light source emits the composite light in the second time interval for increasing a color saturation of the image.

15. The light source module of claim 14, wherein the third light source emits the third light and the composite light source emits the composite light in a third time interval, wherein a white ray is formed by additive mixing of the third light and the composite light for increasing a color brightness of the image.

16. The light source module of claim 12, wherein when the light transmitting area corresponds to the filtered light path, the third light source switches off after emitting the third light in a first time interval, wherein the third light source emits the third light and the composite light source emits the composite light in a second time interval, wherein a white ray is formed by additive mixing of the third light and the composite light for increasing a color brightness of the image.

17. The light source module of claim 1, wherein the intensity of the composite light source is adjustable.

18. The light source module of claim 1, wherein the first color filter area, the second color filter area, and the light transmitting area are fan-shaped trisections having unequal angles.

19. A light source module, comprising:
a filter wheel, wherein the filter wheel is rotatable with respect to a pivot and includes a first color filter area, a second color filter area, and a light transmitting area;
a composite light source disposed on one side of the filter wheel, wherein the composite light source emits a composite light consisting of a first color light and a second color light, wherein:
when the filter wheel rotates to make the first color filter area correspond to a filtered light path, the composite light source emits the composite light to the first color filter area for filtering to obtain a first color light;
when the filter wheel rotates to make the second color filter area correspond to the filtered light path, the composite light source emits the composite light to the second color filter area for filtering to obtain a second color light; and
when the filter wheel rotates to make the light transmitting area correspond to the filtered light path, the composite light source switches on selectively and emits the composite light transmitting through the light transmitting area;
a third light source, wherein when the filter wheel rotates to make the light transmitting area correspond to the filtered light path, the third light source switches on selectively and emits the third light joining with the filtered light path, wherein the time intervals that the composite light source switches on and the third light source switches on are continuous or at least partially overlapping, wherein the third light source switches off when the filter wheel rotates to make the first color filter area correspond to the filtered light path as well as the second color filter area correspond to the filtered light path, wherein the light emitted by the third light source and the light emitted by the composite light source are light of different colors,
wherein the first color light is a red ray, the second color light is a green ray, the third color light is blue ray, wherein the first color filter area allows the red ray to transmit therethrough, the second color filter area allows the green ray to transmit therethrough, the light transmitting area allows the red ray, the green ray, and the blue ray to transmit therethrough.

20. A light source module, comprising:
a filter wheel, wherein the filter wheel is rotatable with respect to a pivot and includes a first color filter area, a second color filter area, and a light transmitting area;
a composite light source disposed on one side of the filter wheel, wherein the composite light source emits a composite light consisting of a first color light and a second color light, wherein:
when the filter wheel rotates to make the first color filter area correspond to a filtered light path, the composite light source emits the composite light to the first color filter area for filtering to obtain a first color light;
when the filter wheel rotates to make the second color filter area correspond to the filtered light path, the composite light source emits the composite light to the second color filter area for filtering to obtain a second color light; and
when the filter wheel rotates to make the light transmitting area correspond to the filtered light path, the composite light source switches on selectively and emits the composite light transmitting through the light transmitting area;
a third light source, wherein when the filter wheel rotates to make the light transmitting area correspond to the filtered light path, the third light source switches on selectively and emits the third light joining with the filtered light path, wherein the time intervals that the composite light source switches on and the third light source switches on are continuous or at least partially overlapping, wherein the third light source switches off when the filter wheel rotates to make the first color filter area correspond to the filtered light path as well as the second color filter area correspond to the filtered light path, wherein the light emitted by the third light source and the light emitted by the composite light source are light of different colors,
wherein the light transmitting area is a transparent plate allowing the composite light and the third light to transmit therethrough.

* * * * *